US010115025B2

(12) United States Patent
Jain et al.

(10) Patent No.: US 10,115,025 B2
(45) Date of Patent: Oct. 30, 2018

(54) DETECTING VISIBILITY OF A VEHICLE TO DRIVER OF OTHER VEHICLES (71) Applicant: Ford Global Technologies, LLC, Dearborn, MA (US)

(72) Inventors: Jinesh J Jain, Palo Alto, CA (US); Harpreetsingh Banvait, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 33 days.

(21) Appl. No.: 15/181,263

(22) Filed: Jun. 13, 2016

(65) Prior Publication Data
US 2017/0357859 A1 Dec. 14, 2017

(51) Int. Cl.
*G06K 9/00* (2006.01)
*B60Q 9/00* (2006.01)
*B60R 1/00* (2006.01)

(52) U.S. Cl.
CPC ......... *G06K 9/00791* (2013.01); *B60Q 9/008* (2013.01); *B60R 1/006* (2013.01); *G06K 9/00228* (2013.01); *G06K 9/00805* (2013.01); *B60R 2300/307* (2013.01); *B60R 2300/8026* (2013.01)

(58) Field of Classification Search
None
See application file for complete search history.

(56) References Cited

U.S. PATENT DOCUMENTS

| 8,190,355 | B2 | 5/2012 | Emam |
| 8,615,109 | B2 | 12/2013 | Shimizu |
| 8,874,267 | B1 | 10/2014 | Dolgov |
| 2008/0046150 | A1* | 2/2008 | Breed ................ B60R 21/0134 701/45 |
| 2013/0311075 | A1 | 11/2013 | Tran |
| 2016/0001781 | A1* | 1/2016 | Fung .................... G06F 19/345 701/36 |

FOREIGN PATENT DOCUMENTS

| JP | 2009187424 A | 8/2009 |
| JP | 2009211309 A | 9/2009 |
| JP | 2012221116 A | 11/2012 |

* cited by examiner

*Primary Examiner* — Idowu O Osifade
(74) *Attorney, Agent, or Firm* — Stevens Law Group; David R. Stevens (57) ABSTRACT

Example blind spot detection systems and methods are described. In one implementation, a primary vehicle detects a secondary vehicle ahead of the primary vehicle in an adjacent lane of traffic. A method determines dimensions of the secondary vehicle and estimates a vehicle class associated with the secondary vehicle based on the dimensions of the secondary vehicle. The method also identifies a side-view mirror location on the secondary vehicle and determines a blind spot associated with the secondary vehicle based on the vehicle class and the side-view mirror location.

18 Claims, 7 Drawing Sheets

DETECTING VISIBILITY OF A VEHICLE TO DRIVER OF OTHER VEHICLES

TECHNICAL FIELD

The present disclosure relates to vehicular systems and, more particularly, to systems and methods that detect blind spots of nearby vehicles.

BACKGROUND

Automobiles and other vehicles provide a significant portion of transportation for commercial, government, and private entities. In areas with heavy vehicle traffic or limited visibility, it is important to understand the location of blind spots of surrounding vehicles. By detecting blind spots of surrounding vehicles, the primary vehicle can adjust its driving activities to avoid another vehicle's blind spot or minimize the time spent driving through the other vehicle's blind spot. Existing systems allow vehicles to detect their own blind spots, but do not identify blind spots of other vehicles.

The variety of vehicles on a typical road have different sizes and shapes as well as different driver positions with respect to the side-view mirrors and windows of the vehicle. Additionally, different vehicles have different sizes and shapes of side-view mirrors. All of these variations create different blind spots (or blind spot zones) for each unique vehicle.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

As used herein, a primary vehicle refers to a vehicle that contains a blind spot detection system and a secondary vehicle refers to another vehicle that is proximate the primary vehicle. As discussed herein, the primary vehicle detects blind spots of one or more secondary vehicles. Further, the primary vehicle may determine whether the driver of a secondary vehicle is likely to see the primary vehicle.

Blind spots are areas near a vehicle that cannot be seen by the driver of the vehicle or are difficult to see by the driver. Blind spots can be caused by vehicle structures (e.g., pillars), headrests, passengers, cargo, and gaps in the coverage provided by vehicle mirrors. Example blind spots include areas over the driver's left shoulder, over the driver's right shoulder, and behind the vehicle.

The disclosure relates generally to methods, systems, and apparatuses for automated or assisted driving and, more particularly, relates to detecting blind spots of one or more nearby vehicles. According to one embodiment, a method uses a blind spot detection system in a primary vehicle to detect a secondary vehicle ahead of the primary vehicle in an adjacent lane of traffic. The method determines a location of the secondary vehicle and the dimensions of the secondary vehicle. The blind spot detection system estimates a class of vehicle associated with the secondary vehicle based on the dimensions of the secondary vehicle. The method further identifies a side-view mirror location on the secondary vehicle and detects a blind spot associated with the secondary vehicle based on the class of vehicle and the side-view mirror location. The method then determines whether the primary vehicle is in the blind spot of the secondary vehicle based on the class of vehicle and the side-view mirror location.

According to another embodiment, a method uses a blind spot detection system in a primary vehicle to detect a secondary vehicle ahead of the primary vehicle in an adjacent lane of traffic. The method receives an image of the secondary vehicle from a camera mounted to the primary vehicle and identifies a side-view mirror in the received image. The method analyzes the image in the side-view mirror to determine a head position of a driver of the secondary vehicle. The method further determines whether the driver of the secondary vehicle is likely to see the primary vehicle based on the head position of the driver of the secondary vehicle.

Although particular examples discussed herein refer to cars and similar types of vehicles, the systems and methods described herein are applicable to any type of vehicle. For example, the blind spot detection systems and methods are useful in cars, trucks of all sizes, vans, buses, motorcycles, and the like. The described systems and methods are particularly useful for smaller cars and motorcycles that can be more difficult to see by other drivers and may be completely hidden within a blind spot.

Figure 1:
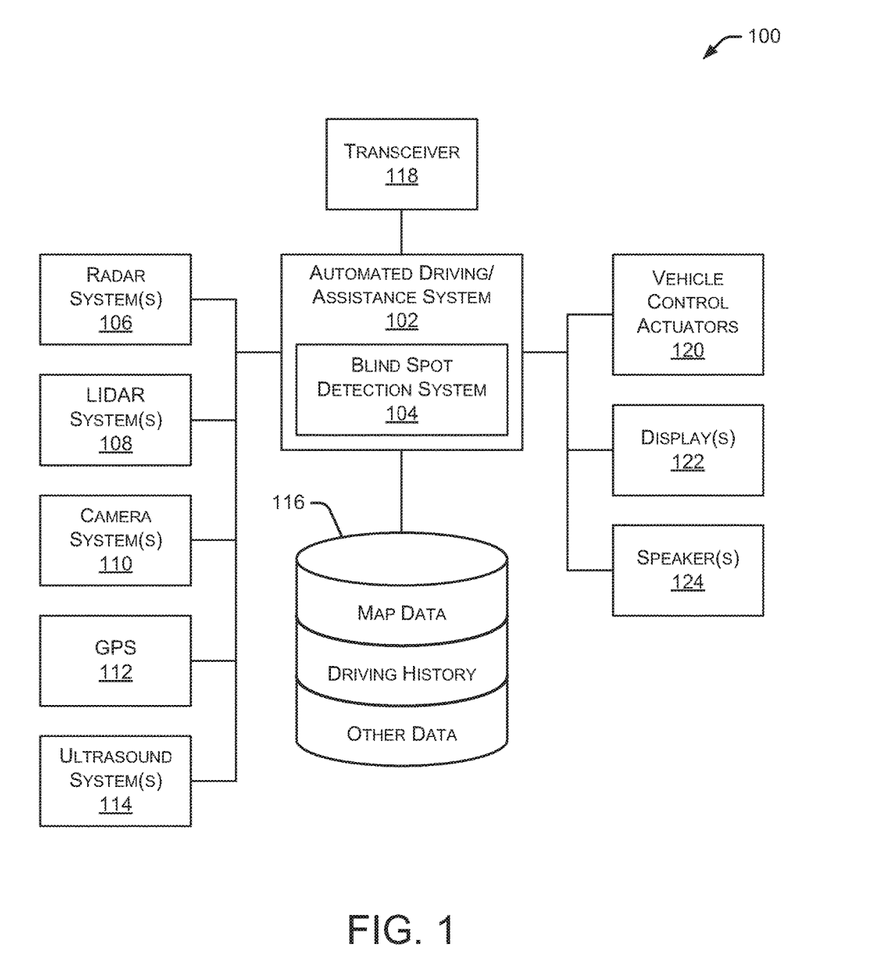
FIG. 1 is a block diagram illustrating an embodiment of a vehicle control system that includes an automated driving/assistance system.

FIG. 1 is a block diagram illustrating an embodiment of a vehicle control system 100 that may be used to detect blind spots in nearby vehicles. An automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may include a blind spot detection system 104 that uses vehicle sensor data, vehicle-mounted camera data, and one or more processors to detect blind spots of nearby vehicles and determine whether a driver of another vehicle can likely see the vehicle in which the blind spot detection system 104 is installed. In one embodiment, the automated driving/assistance system 102 may determine a driving maneuver or driving path to reduce or eliminate the time spent driving in blind spots of other vehicles.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR (Light Detection And Ranging) systems 108, one or more camera systems 110, a global positioning system (GPS) 112, and/or ultrasound systems 114. The one or more camera systems 110 may include a front-facing camera mounted to the vehicle. The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time.

In some embodiments, vehicle control system 100 may contain fewer components than those shown in FIG. 1. For example, an embodiment of vehicle control system 100 for a motorcycle may contain fewer components due to the limited space available for such components on a motorcycle.

Figure 2:
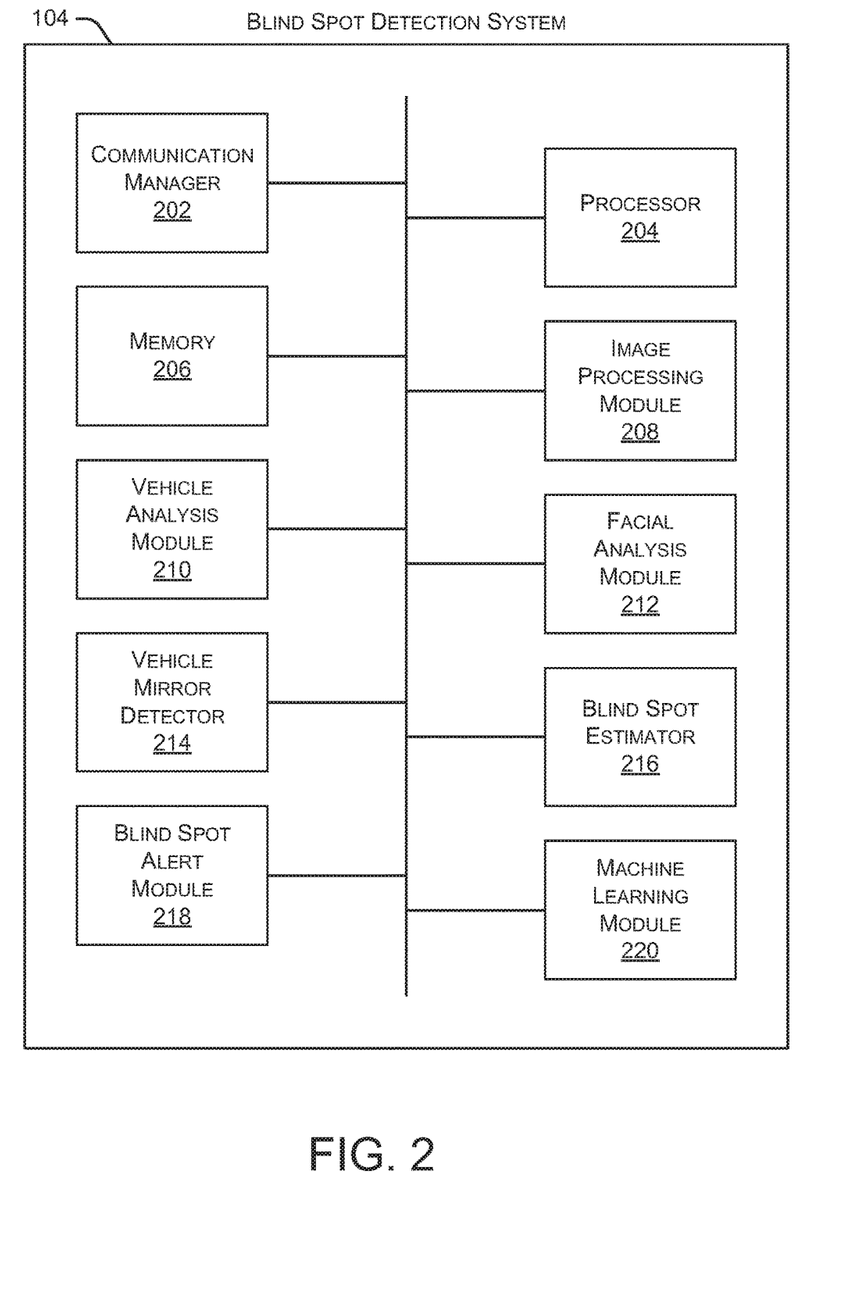
FIG. 2 is a block diagram illustrating an embodiment of a blind spot detection system.

FIG. 2 is a block diagram illustrating an embodiment of a blind spot detection system 104. As shown in FIG. 2, blind spot detection system 104 includes a communication manager 202, a processor 204, and a memory 206. Communication manager 202 allows blind spot detection system 104 to communicate with other systems, such as automated driving/assistance system 102. Processor 204 executes various instructions to implement the functionality provided by blind spot detection system 104 and discussed herein. Memory 206 stores these instructions as well as other data used by processor 204 and other modules contained in blind spot detection system 104.

Additionally, blind spot detection system 104 includes an image processing module 208 that analyzes images received from one or more cameras. For example, image processing module 208 may identify secondary vehicles near the primary vehicle (i.e., secondary vehicles that may have blind spots near the primary vehicle). In some embodiments, image processing module 208 may identify objects within one or more images, such as vehicle side-view mirrors and images shown within those side-view mirrors. Image processing module 208 uses various image analysis algorithms and techniques to identify objects within the images. In some embodiments, the image analysis algorithms and techniques include machine learning-based artificial intelligence algorithms that are based, for example, on a convolutional neural network architecture or recurrent neural network architecture.

A vehicle analysis module 210 analyzes image data and other information to determine a location, size, type, and orientation of secondary vehicles located near the primary vehicle. As discussed herein, the location, size, type, and orientation of a secondary vehicle is used to determine blind spots associated with that vehicle. When analyzing secondary vehicles, the vehicle analysis module 210 may use image data as well as data from one or more vehicle sensors, such as radar sensors, LIDAR sensors, and ultrasound sensors. The type of vehicle (or classification of vehicle) associated with a secondary vehicle includes, for example, a small car, a standard-sized car, a truck, a van, a bus, and the like. These different types of vehicles have different blind spots (also referred to as blind spot zones) due to their different shapes and sizes.

Blind spot detection system 104 also includes a facial analysis module 212 that can identify a face, a user's gaze direction, and a user's head position. As discussed in greater detail herein, facial analysis module 212 may analyze an image within a side-view mirror to determine whether the driver of a secondary vehicle is looking into the side-view mirror or looking in a different direction. For example, a facial recognition algorithm may determine whether the face of the driver of the secondary vehicle is visible within the side-view mirror, indicating that the driver of the secondary vehicle is looking into the side-view mirror. A vehicle mirror detector 214 identifies mirrors on secondary vehicles, such as side-view mirrors. As discussed herein, the secondary vehicle mirrors may be identified in images of the secondary vehicle captured by a camera mounted to the primary vehicle.

A blind spot estimator 216 estimates the blind spots for secondary vehicles based on various factors, such as the location, size, type, and orientation of secondary vehicles. A blind spot alert module 218 generates alerts or warnings to a driver of a primary vehicle (or an automated driving system of the primary vehicle) if the primary vehicle is currently in a secondary vehicle's blind spot or about to drive into a secondary vehicle's blind spot. The alert or warning can be an audible alert, a visual alert, a haptic alert, and the like. A machine learning module 220 learns various information about vehicle classifications, vehicle blind spots, and related data based on test data and the results of actual driving activity.

In some embodiments, blind spot detection system 104 may communicate (e.g., using vehicle-to-vehicle (V2V) communication systems) with other vehicles (e.g., secondary vehicles) to receive information from those other vehicles regarding their blind spots. For example, as a primary vehicle is approaching a secondary vehicle in an adjacent lane, the secondary vehicle may communicate information regarding the secondary vehicle's blind spots to the primary vehicle. This information is used by the primary vehicle to make any necessary speed or steering adjustments as it approaches and passes the secondary vehicle.

Figure 3:
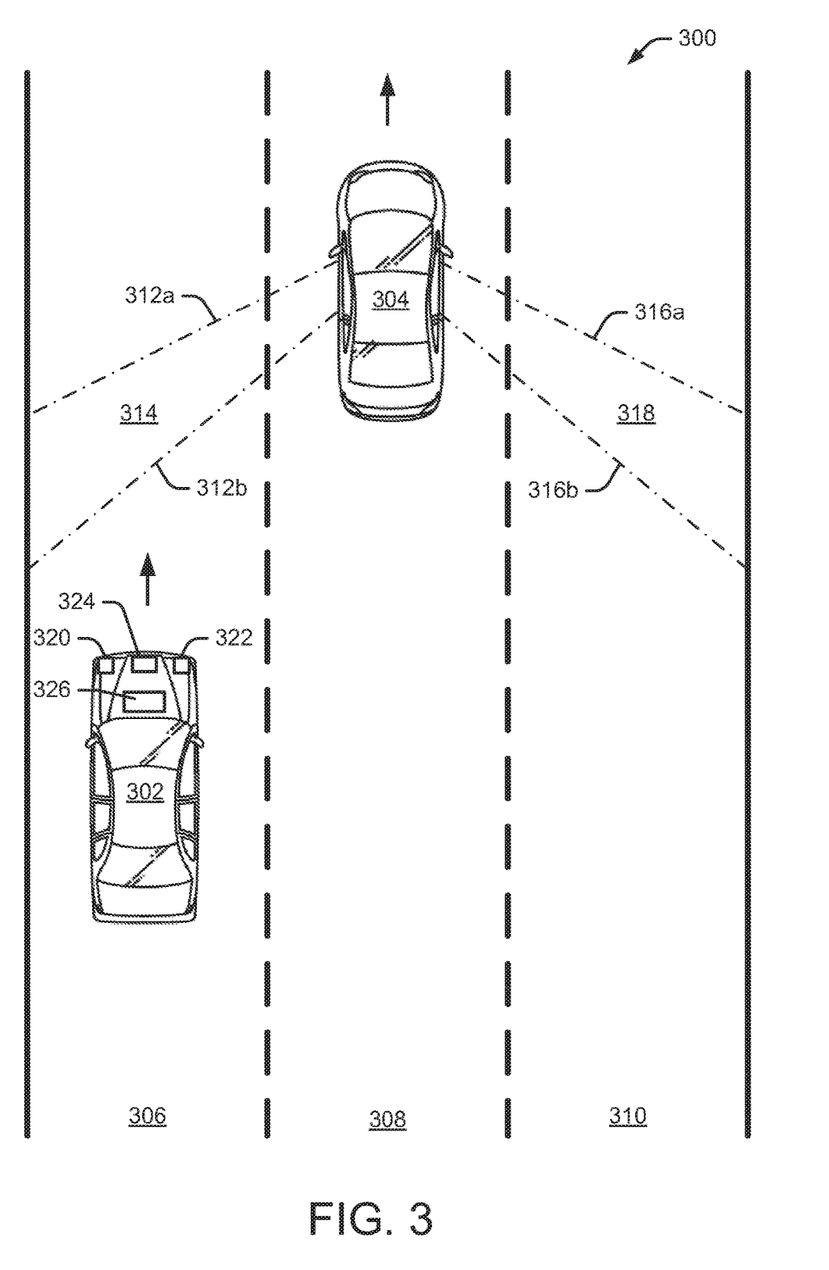
FIG. 3 illustrates an example of a multiple-lane roadway with multiple vehicles traveling in the same direction.

FIG. 3 illustrates an example of a multiple-lane roadway 300 with multiple vehicles 302 and 304 traveling in the same direction. Roadway 300 includes three lanes 306, 308, and 310. In the example of FIG. 3, vehicle 302 is the primary vehicle and vehicle 304 is the secondary vehicle. Secondary vehicle 304 has a first blind spot 314 over the driver's left shoulder and a second blind spot 318 over the driver's right shoulder. Blind spot 314 is approximately defined by broken lines 312a and 312b. Similarly, blind spot 318 is approximately defined by broken lines 316a and 316b. Blind spots 314 and 316 are shown as examples. The specific shape, size, and orientation of a particular vehicle's blind spot varies based on various factors such as the vehicle size, type, orientation, and the like. In some embodiments, another blind spot exists behind secondary vehicle 304.

As shown in FIG. 3, primary vehicle 302 is approaching blind spot 314. Primary vehicle 302 includes a blind spot detection system 326 that is similar to blind spot detection system 104 discussed herein. Primary vehicle 302 also includes at least one camera 324 and two radar sensors 320 and 322. In particular implementations, vehicle 302 may include any number of cameras, any number of radar sensors, and other sensors, such as LIDAR sensors and ultrasound sensors. As discussed herein, camera 324 is capable of capturing images of areas surrounding primary vehicle 302 to identify secondary vehicles in adjacent lanes. Additionally, camera 324 can capture images of particular secondary vehicles, such as images that include the secondary vehicle's side-view mirror. In some embodiments, the images captured by camera 324 are used to determine a size, location, orientation, and type of secondary vehicle. Radar sensors 320 and 322 also identify secondary vehicles proximate the primary vehicle 302 and certain characteristics of the secondary vehicles. In some embodiments, ultrasound detectors are used to determine the location of a secondary vehicle when it is in close proximity to a primary vehicle. Radar sensors can detect secondary vehicles that are farther away from the primary vehicle. LIDAR sensors are used to determine a distance between the primary vehicle and the secondary vehicle. Cameras and camera images are useful in determining a secondary vehicle type, size, side-view mirror location, and the like.

Figure 4:
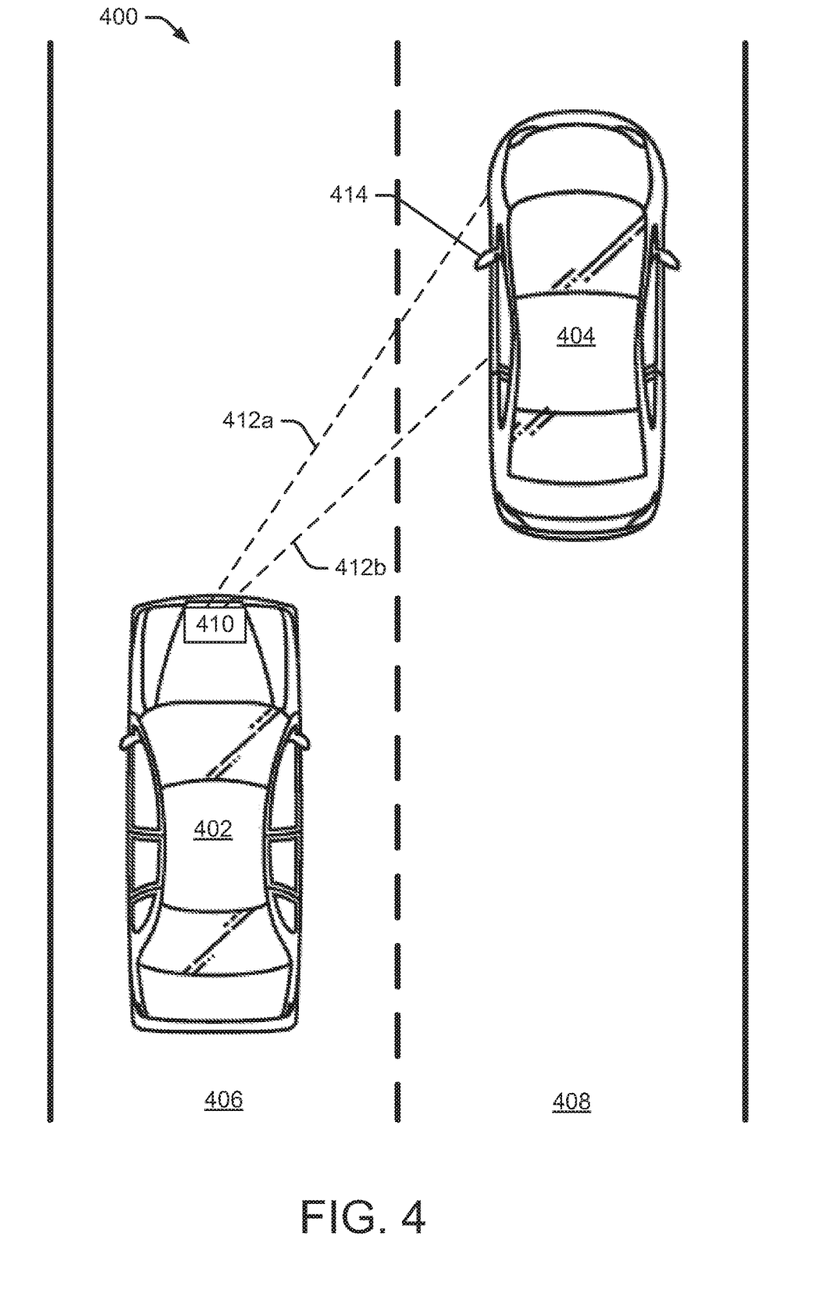
FIG. 4 illustrates another example of a multiple-lane roadway with multiple vehicles traveling in the same direction.

FIG. 4 illustrates another example of a multiple-lane roadway 400 with multiple vehicles 402 and 404 traveling in the same direction. Roadway 400 includes two lanes 406 and 408. In the example of FIG. 4, vehicle 402 is the primary vehicle and vehicle 404 is the secondary vehicle. Primary vehicle 402 includes a camera 410 that can capture images of secondary vehicle 404. Although not shown in FIG. 4, primary vehicle 402 also includes a vehicle control system (including a blind spot detection system). In some embodiments, primary vehicle 402 may also include additional cameras and one or more sensors, such as radar sensors, LIDAR sensors, and ultrasound sensors.

In the example of FIG. 4, camera 410 can capture an image of at least a portion of secondary vehicle 404. In this example, camera 410 captures an image of the left side of secondary vehicle 404, including a left side-view mirror 414. The boundaries of the camera's image capture is shown by broken lines 412a and 412b. In some embodiments, the boundaries of the image capture by camera 410 are adjustable to change the size of the area captured in each image. As discussed herein, the blind spot detection system can analyze image data from camera 410 to identify the size, location, and type of vehicle associated with secondary vehicle 404. Additionally, the blind spot detection system may use image data from camera 410 to identify side-view mirror 414 and identify an image shown in side-view mirror 414 (e.g., to determine if the driver of secondary vehicle 404 is looking into side-view mirror 414 or away from side-view mirror 414.

Figure 5:
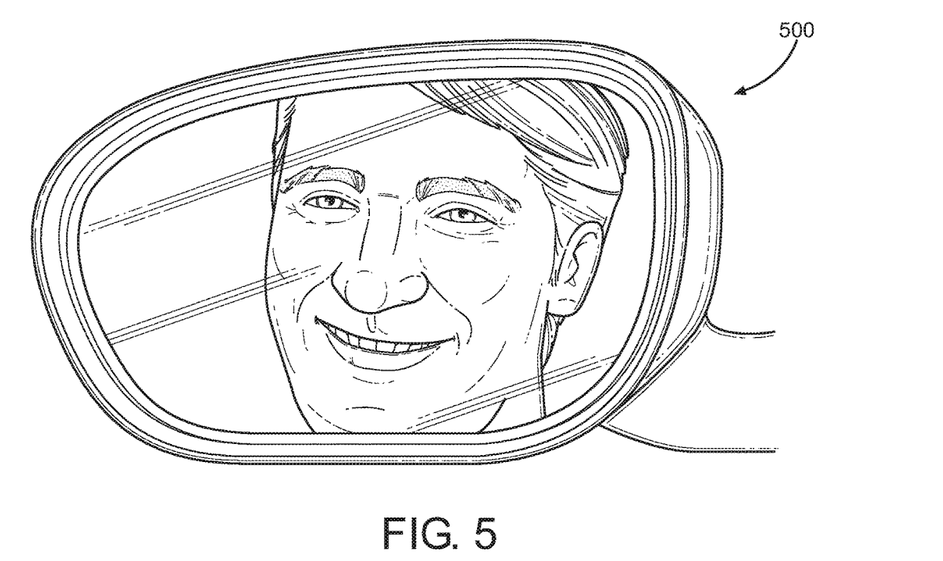
FIG. 5 illustrates an example image in a side-view mirror of a vehicle showing a driver looking into the side-view mirror.

FIG. 5 illustrates an example image in a side-view mirror 500 of a vehicle showing a driver looking into the side-view mirror. The example of FIG. 5 illustrates an image shown in a side-view mirror of a secondary vehicle indicating that the driver of the secondary vehicle is looking into the side-view mirror. In this situation, the blind spot detection system can determine that there is a strong likelihood that the driver of the secondary vehicle can see the primary vehicle in the side-view mirror. Since the camera mounted to the primary vehicle can see the face of the secondary vehicle's driver, it is likely that the driver can also see the primary vehicle in the side-view mirror. This situation reduces the risk of driving through the blind spot of the secondary vehicle because the driver of the secondary vehicle is likely to see the primary vehicle and be aware of the primary vehicle as it approaches the secondary vehicle.

Figure 6:
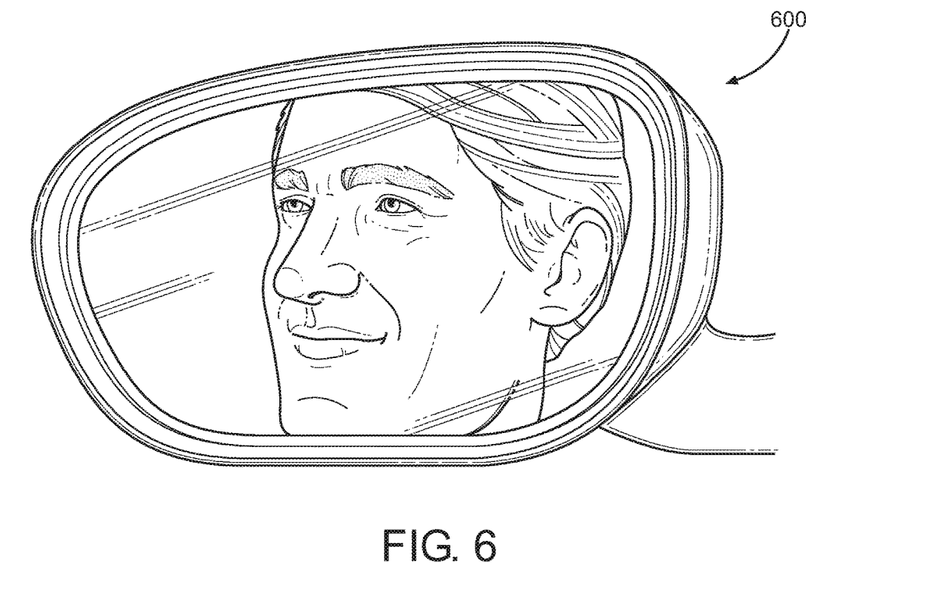
FIG. 6 illustrates an example image in a side-view mirror of a vehicle showing a driver looking away from the side-view mirror.

FIG. 6 illustrates an example image in a side-view mirror 600 of a vehicle showing a driver looking away from the side-view mirror. The example of FIG. 6 illustrates an image shown in a side-view mirror of a secondary vehicle indicating that the driver of the secondary vehicle is looking away from the side-view mirror. In this situation, the blind spot detection system can determine that there is a strong likelihood that the driver of the secondary vehicle does not see the primary vehicle in the side-view mirror. Since the driver of the secondary vehicle is looking away from the primary vehicle, the driver is not likely to see the primary vehicle. This situation increases the risk of driving through the blind spot of the secondary vehicle because the driver of the secondary vehicle may not see that the primary vehicle is approaching and driving through the blind spot. Thus, the driver of the secondary vehicle may be unaware of the existence of the primary vehicle.

Figure 7:
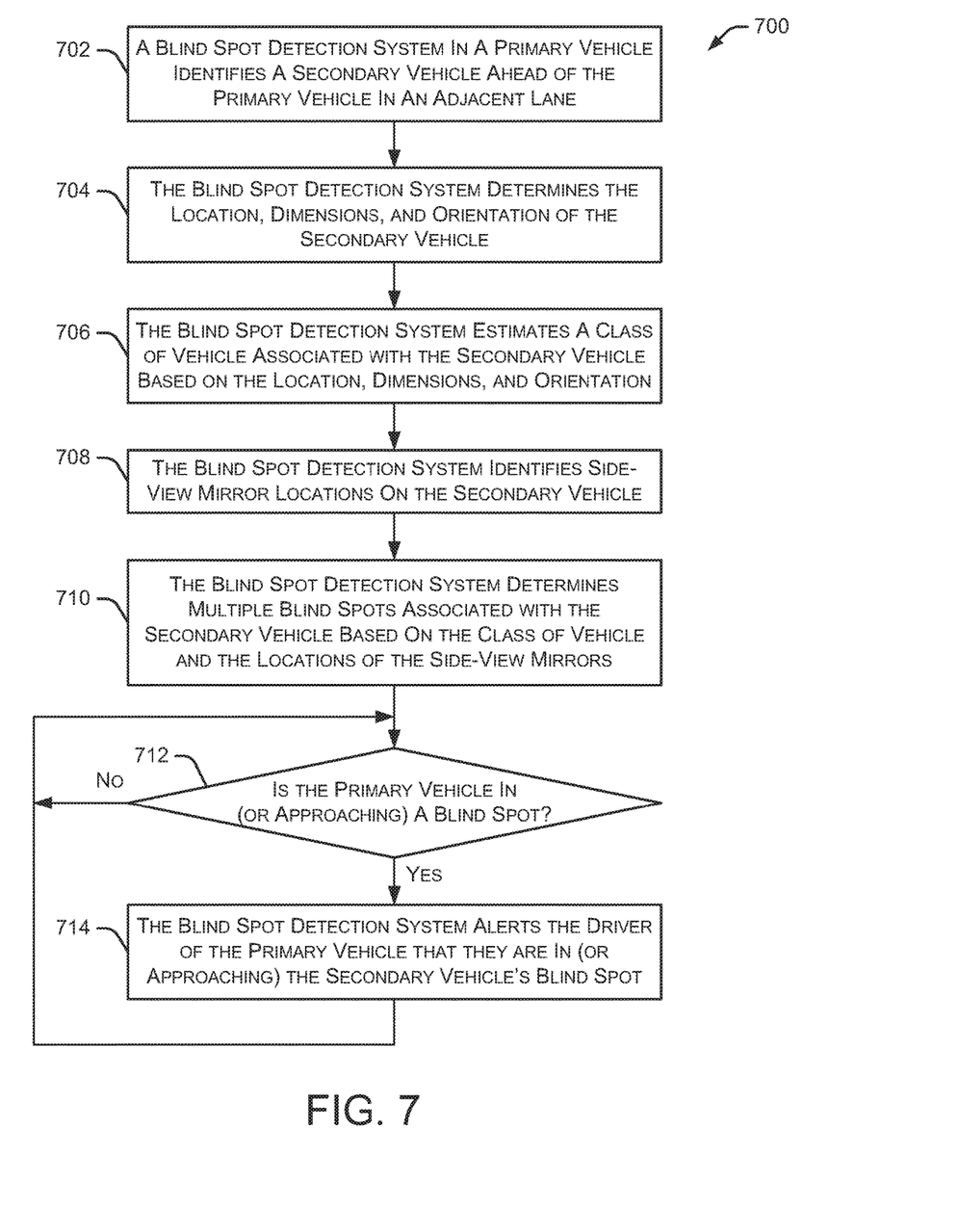
FIG. 7 is a flow diagram illustrating an embodiment of a method for detecting blind spots of a secondary vehicle.

FIG. 7 is a flow diagram illustrating an embodiment of a method 700 for detecting blind spots of a secondary vehicle. Initially, a blind spot detection system in a primary vehicle identifies a secondary vehicle ahead of the primary vehicle in an adjacent lane at 702. As mentioned herein, the blind spot detection system identifies the secondary vehicle using a vehicle-mounted camera and one or more sensors, such as radar sensors, LIDAR sensors, and ultrasound sensors. The blind spot detection system determines the location, dimensions, and orientation of the secondary vehicle at 704. In some embodiments, the location, dimensions, and orientation of the secondary vehicle is determined based on sensor data, including one or more of radar sensor data, LIDAR sensor data, ultrasound sensor data, and the like.

The blind spot detection system estimates, at 706, a class or type of vehicle associated with the secondary vehicle based on one or more of the location, dimensions, and orientation of the secondary vehicle. In some embodiments, the location, dimensions, and orientation of the secondary vehicle is determined based on sensor data, including one or more of radar sensor data, LIDAR sensor data, ultrasound sensor data, and the like. Method 700 continues as the blind spot detection system identifies one or more side-view mirror locations on the secondary vehicle at 708. The blind spot detection system then determines, at 710, multiple blind spots associated with the secondary vehicle based on the class of vehicle and the location of the side-view mirrors. In some embodiments, a machine learning-based algorithm determines multiple blind spots associated with the secondary vehicle based on multiple previous determinations and previous algorithm training.

After identifying the blind spots of the secondary vehicle, the method determines, at 712, whether the primary vehicle is in (or approaching) a blind spot of the secondary vehicle. If the primary vehicle is in (or approaching) a blind spot of the secondary vehicle, the blind spot detection system alerts the driver of the primary vehicle, at 714, that they are in (or approaching) the secondary vehicle's blind spot. In response to this alert, the driver may slow down or change lanes to avoid driving through the blind spot or the driver may increase the speed of the primary vehicle to minimize the time needed to pass through the blind spot. If the primary vehicle is controlled by an automated driving system, that system may adjust the primary vehicle's speed or driving activities based on the existence of the blind spot.

If the primary vehicle is not in (or approaching) a blind spot of the secondary vehicle, the method continues monitoring the secondary vehicle to determine whether the primary vehicle approaches or enters the blind spot of the secondary vehicle.

Figure 8:
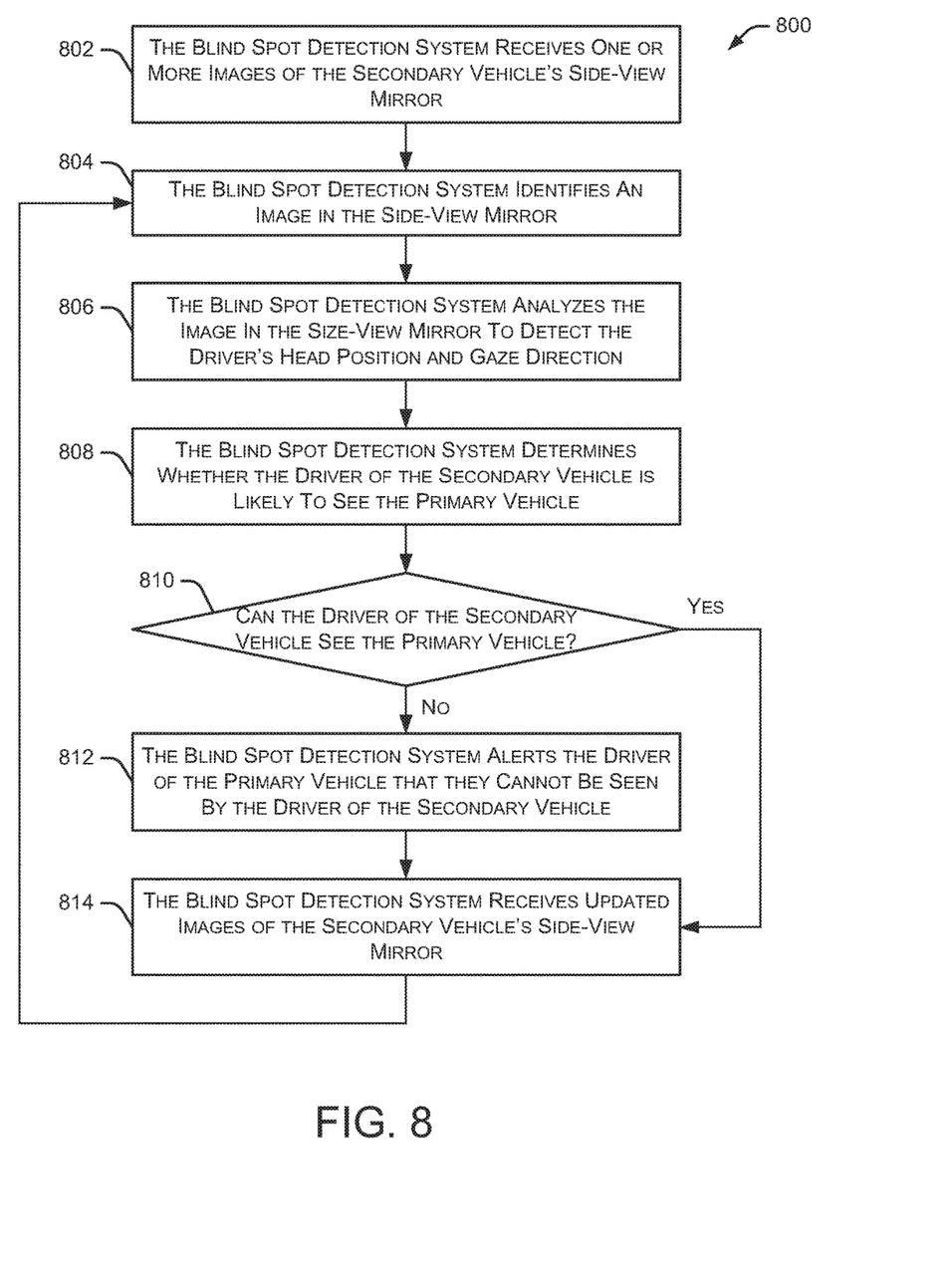
FIG. 8 is a flow diagram illustrating an embodiment of a method for determining whether a driver of a secondary vehicle is looking at the primary vehicle.

FIG. 8 is a flow diagram illustrating an embodiment of a method 800 for determining whether a driver of a secondary vehicle is looking at the primary vehicle. Initially, the blind spot detection system receives one or more images of the secondary vehicle's side-view mirror at 802. The blind spot detection system identifies an image in the side-view mirror of the secondary vehicle at 804. The method continues as the blind spot detection system analyzes, at 806, the image in the side-view mirror of the secondary vehicle to detect the driver's head position and gaze direction. For example, the image in the side-view mirror of the secondary vehicle may include the driver's face, the side of the driver's head, the back of the driver's head, or some other object. If the driver's head position is facing the side-view mirror, the image will show the driver's face. However, if the driver's head position is not facing the side-view mirror (e.g., looking straight ahead or looking away from the side-view mirror), the side or back of the driver's head will be seen in the image.

Method 800 continues as the blind spot detection system determines, at 808, whether the driver of the secondary vehicle is likely to see the primary vehicle. For example, if the driver's face is visible within the side-view mirror it is likely that the driver can see the primary vehicle in the side-view mirror. However, if the side or back of the driver's head is visible within the side-view mirror, then it is likely that the driver cannot see the primary vehicle. In some embodiments, a facial recognition algorithm is used to determine whether the face of the driver of the secondary vehicle is visible within the side-view mirror. If the driver of the secondary vehicle cannot see the primary vehicle at 810, the method continues as the blind spot detection system alerts, at 812, the driver of the primary vehicle that they cannot be seen by the driver of the secondary vehicle. In response to this alert, the driver may slow down or change lanes to avoid driving through the blind spot or the driver may increase the speed of the primary vehicle to minimize the time needed to pass through the blind spot. If the primary vehicle is controlled by an automated driving system, that system may adjust the primary vehicle's speed or driving activities based on the existence of the blind spot.

Method 800 continues as the blind spot detection system receives updated images of the secondary vehicle's side-view mirror at 814. The method continues to 804 to identify an image in the side-view mirror of the updated images.

In some embodiments, secondary vehicle detection and blind spot estimation are performed using deep learning and/or machine learning-based techniques. For example, a machine learning-based algorithm may take input from multiple sensors, such as radar sensors, LIDAR sensors, ultrasound sensors, and cameras. The data from the multiple sensors passes through several layers of neural network, which include several different types of layer architectures, such as convolutional, deconvolution, and recurrent. In alternate embodiments, other types of deep learning and/or machine learning-based techniques are used to detect secondary vehicles and estimate vehicle blind spots.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   detecting, by a computer in a primary vehicle, a secondary vehicle ahead of the primary vehicle;
   receiving an image of the secondary vehicle from a camera mounted to the primary vehicle, the camera being forward facing;
   identifying, by the computer, an image of a side-view mirror in the received image;
   analyzing, by the computer, a reflected image within the image of the side-view mirror to determine a head position of a secondary vehicle driver by applying a facial recognition algorithm to determine if the face of the secondary vehicle driver is visible in the reflected image; and
   determining, by the computer, whether the driver can see the primary vehicle based on the head position of the driver.

2. The method of claim 1, wherein analyzing the reflected image further comprises determining a gaze direction of the driver of the secondary vehicle.

3. The method of claim 2, wherein determining whether the driver can see the primary vehicle is further based on the gaze direction of the driver of the secondary vehicle.

4. The method of claim 1, wherein detecting the secondary vehicle is based on data received from at least one sensor mounted to the primary vehicle.

5. The method of claim 4, wherein the sensor mounted to the primary vehicle is one of a Radar sensor, a LIDAR sensor or an ultrasound sensor.

6. The method of claim 1, wherein detecting the secondary vehicle is based on data received from at least one camera mounted to the primary vehicle.

7. The method of claim 1, further comprising alerting a driver of the primary vehicle responsive to determining that the secondary vehicle driver cannot see the primary vehicle.

8. The method of claim 1, wherein alerting the driver of the primary vehicle includes generating at least one of an audible alert, a visual alert, and a haptic alert.

9. The method of claim 1, further comprising automatically adjusting the speed of the primary vehicle responsive to determining that the secondary vehicle driver cannot see the primary vehicle.

10. The method of claim 1, further comprising automatically adjusting the driving activities of the primary vehicle responsive to determining that the secondary vehicle driver cannot see the primary vehicle.

11. A method comprising:
 detecting, by a blind spot detection system in a primary vehicle, a secondary vehicle ahead of the primary vehicle in an adjacent lane of traffic;
 receiving an image of the secondary vehicle from a camera mounted to the primary vehicle, the camera being forward facing;
 identifying an image of a side-view mirror in the received image;
 analyzing a reflected image within the image of the side-view mirror to determine whether a face of a driver of the secondary vehicle is visible within the side-view mirror by applying a facial recognition algorithm to the reflected image to determine whether the face of the driver of the secondary vehicle driver is visible within the side-view mirror;
 determining that the driver of the secondary vehicle is not likely to see the primary vehicle based on the head position of the driver of the secondary vehicle in the reflected image; and
 alerting a driver of the primary vehicle responsive to determining that the secondary vehicle driver cannot see the primary vehicle.

12. The method of claim 11, wherein analyzing the reflected image further comprises determining a gaze direction of the driver of the secondary vehicle.

13. The method of claim 11, wherein detecting the secondary vehicle is based on data received from at least one sensor mounted to the primary vehicle.

14. The method of claim 13, wherein the sensor mounted to the primary vehicle is one of a Radar sensor, a LIDAR sensor or an ultrasound sensor.

15. The method of claim 11, wherein alerting the driver of the primary vehicle includes generating at least one of an audible alert, a visual alert, and a haptic alert.

16. The method of claim 11, further comprising automatically adjusting the driving activities of the primary vehicle responsive to determining that the face of the driver of the secondary vehicle is not visible within the side-view mirror.

17. An apparatus comprising:
 an image processing module configured to detect a secondary vehicle ahead of a primary vehicle, the image processing module further configured to receive an image of the secondary vehicle from a camera mounted to the primary vehicle;
 a vehicle mirror detector configured to identify an image of a side-view mirror in the received image; and
 a facial analysis module configured to analyze a reflected image within the image of the side-view mirror to determine a head position of a driver of the secondary vehicle, the facial analysis module further configured to determine whether the driver of the secondary vehicle can see the primary vehicle based on the head position of the driver.

18. The apparatus of claim 17, further comprising a blind spot alert module configured to alert a driver of the primary vehicle if the driver of the secondary vehicle cannot see the primary vehicle.

* * * * *